United States Patent
Narayanam (10) Patent No.: US 10,664,200 B2
(45) Date of Patent: May 26, 2020

(54) DIRECTING READ REQUEST WITH DISK DEDUPLICATION

(71) Applicant: International Business Machines Corporation, Armonk, NY (US)

(72) Inventor: Krishnasuri Narayanam, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 15/252,024

(22) Filed: Aug. 30, 2016

(65) Prior Publication Data

US 2018/0059964 A1    Mar. 1, 2018

(51) Int. Cl.
*G06F 3/06* (2006.01)

(52) U.S. Cl.
CPC ............ *G06F 3/0689* (2013.01); *G06F 3/067* (2013.01); *G06F 3/0608* (2013.01); *G06F 3/0611* (2013.01); *G06F 3/0635* (2013.01); *G06F 3/0641* (2013.01)

(58) Field of Classification Search
CPC ............. G06F 3/0641; G06F 17/30156; G06F 11/2056–2087
See application file for complete search history.

(56) References Cited

U.S. PATENT DOCUMENTS

| | | | |
|---|---|---|---|
| 7,504,969 B2 | 3/2009 | Patterson et al. | |
| 7,519,635 B1 | 4/2009 | Haustein et al. | |
| 8,095,756 B1 * | 1/2012 | Somavarapu | G06F 11/1453 711/162 |
| 8,205,065 B2 | 6/2012 | Matze | |
| 8,280,859 B2 | 10/2012 | Anglin et al. | |
| 8,660,994 B2 | 2/2014 | Slater et al. | |
| 9,256,374 B1 | 2/2016 | Aron et al. | |
| 2008/0244172 A1 * | 10/2008 | Kano | G06F 11/2069 711/112 |
| 2011/0055471 A1 | 3/2011 | Thatcher et al. | |

(Continued)

*Primary Examiner* — Edward J Dudek, Jr.
*Assistant Examiner* — Andrew Russell
(74) *Attorney, Agent, or Firm* — Ference & Associates LLC (57) ABSTRACT

One embodiment provides a method, including: utilizing at least one processor to execute computer code that performs the steps of: receiving a read request for a data-chunk, wherein the data-chunk is stored on a system comprising a plurality of logical volumes and wherein at least one of the logical volumes comprises a mirrored logical volume corresponding to another of the at least one logical volumes; identifying one of the logical volumes of the system where the requested data-chunk is stored in plain format, wherein the identifying comprises: ensuring the data-chunk is in plain format on one of the logical volumes by implementing a data deduplication policy on the system, wherein the data deduplication policy designates one of the logical volumes from the mirrored logical volume and the corresponding logical volume as not being deduplicated; and wherein the identified one of the logical volumes comprises the designated non-deduplicated logical volume that comprises the data-chunk; and directing the read request to the identified one of the logical volumes. Other aspects are described and claimed.

20 Claims, 5 Drawing Sheets

(56) References Cited

U.S. PATENT DOCUMENTS

| | | | |
|---|---|---|---|
| 2013/0091102 A1 | 4/2013 | Nayak | |
| 2013/0262404 A1* | 10/2013 | Daga | G06F 16/215 |
| | | | 707/692 |
| 2013/0282675 A1* | 10/2013 | Fiske | G06F 16/1748 |
| | | | 707/692 |
| 2017/0255643 A1* | 9/2017 | Maheshwari | G06F 16/1748 |
| 2017/0269850 A1* | 9/2017 | Garg | G06F 3/0608 |

* cited by examiner

DIRECTING READ REQUEST WITH DISK DEDUPLICATION

BACKGROUND

Many systems use disk mirroring to provide redundancy and high availability of the system. For example, if all the data disks have been mirrored, when one of the disks fails the system can access the requested data from the back-up disk. Once a replacement disk has been installed for the failed disk, the back-up disk can be used to repopulate the data. In order to reduce the risk associated with mirroring disks, typically the data disk is split into logical volumes. The logical volumes are then mirrored across different disks. For example, assume the system includes Disk A and Disk B and the system has three logical volumes, Volume 1, Volume 2, and Volume 3. Disk A may include the primary version of Volume 1 and Volume 3 and the mirrored version of Volume 2. Disk B may include the mirrored version of Volume 1 and Volume 3 and the primary version of Volume 2.

To assist in improving storage utilization, a system may employ data deduplication techniques. The data deduplication techniques identify repeated blocks of data, for example, blocks repeated across multiple volumes or disks. Data deduplication eliminates the redundancy by storing the repeated data only a single time. Any occurrence of the same block of data is then replaced with a link or reference to the already stored data block. Even though one of the volumes may be a mirror of another of the volumes, the repeated data may be on either the primary or the mirrored version of the volume. Additionally, data deduplication techniques generally have a target ratio associated with them which identify the percentage of the disk that should be deduplicated. Thus, the data deduplication techniques may affect both the primary and the mirrored versions of the disk or logical volume. In other words, the primary version of the disk or logical volume may contain both actual data blocks and also links or references to other data blocks.

BRIEF SUMMARY

In summary, one aspect of the invention provides a method, comprising: utilizing at least one processor to execute computer code that performs the steps of: receiving a read request for a data-chunk, wherein the data-chunk is stored on a system comprising a plurality of logical volumes and wherein at least one of the logical volumes comprises a mirrored logical volume corresponding to another of the at least one logical volumes; identifying one of the logical volumes of the system where the requested data-chunk is stored in plain format, wherein the identifying comprises: ensuring the data-chunk is in plain format on one of the logical volumes by implementing a data deduplication policy on the system, wherein the data deduplication policy designates one of the logical volumes from the mirrored logical volume and the corresponding logical volume as not being deduplicated; and wherein the identified one of the logical volumes comprises the designated non-deduplicated logical volume that comprises the data-chunk; and directing the read request to the identified one of the logical volumes.

Another aspect of the invention provides an apparatus, comprising: at least one processor; and a computer readable storage medium having computer readable program code embodied therewith and executable by the at least one processor, the computer readable program code comprising: computer readable program code that receives a read request for a data-chunk, wherein the data-chunk is stored on a system comprising a plurality of logical volumes and wherein at least one of the logical volumes comprises a mirrored logical volume corresponding to another of the at least one logical volumes; computer readable program code that identifies one of the logical volumes of the system where the requested data-chunk is stored in plain format, wherein the identifying comprises: ensuring the data-chunk is in plain format on one of the logical volumes by implementing a data deduplication policy on the system, wherein the data deduplication policy designates one of the logical volumes from the mirrored logical volume and the corresponding logical volume as not being deduplicated; and wherein the identified one of the logical volumes comprises the designated non-deduplicated logical volume that comprises the data-chunk; and computer readable program code that directs the read request to the identified one of the logical volumes.

An additional aspect of the invention provides a computer program product, comprising: a computer readable storage medium having computer readable program code embodied therewith, the computer readable program code comprising: computer readable program code that receives a read request for a data-chunk, wherein the data-chunk is stored on a system comprising a plurality of logical volumes and wherein at least one of the logical volumes comprises a mirrored logical volume corresponding to another of the at least one logical volumes; computer readable program code that identifies one of the logical volumes of the system where the requested data-chunk is stored in plain format, wherein the identifying comprises: ensuring the data-chunk is in plain format on one of the logical volumes by implementing a data deduplication policy on the system, wherein the data deduplication policy designates one of the logical volumes from the mirrored logical volume and the corresponding logical volume as not being deduplicated; and wherein the identified one of the logical volumes comprises the designated non-deduplicated logical volume that comprises the data-chunk; and computer readable program code that directs the read request to the identified one of the logical volumes.

A further aspect of the invention provides a method, comprising: implementing a data deduplication policy on a system comprising a plurality of logical volumes, wherein one of the logical volumes comprises a mirrored logical volume corresponding to another of the logical volumes; the data deduplication policy comprising designating one of the logical volumes from the mirrored logical volume and the corresponding logical volume as not being deduplicated; receiving a read request for a data-chunk stored on at least one of the logical volumes; and directing the read request to the logical volume that has been designated as not being deduplicated.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Data deduplication allows for a reduction in the redundancy of data stored across multiple logical volumes or data disks, which assists in improving storage utilization. One problem with data deduplication is that if a read request is directed to the deduplicated data block (i.e., where the data block comprises a reference or link to another data block), the access time for the data is reduced. This reduction in access time is created because the request is directed to a first data block and then to a second data block having the data in a readable form. Therefore, system performance degradation occurs using current deduplication techniques. For example, referring to FIG. 1A, when a read request 101A is received, an Input/Output (I/O) scheduler 102A directs the read request 101A to one of the logical volumes 104A or 105A. Since the system does not know which logical volumes 104A or 105A contains the data-chunk requested in plain format, the read request 101A may be directed to the logical volume 104A where the data-chunk is a reference to the data-chunk block in plain format on logical volume 105A. Thus, the response time 103A is increased by the amount of time required to redirect the read request 101A.

Accordingly, for a system having a plurality of logical volumes including mirrors of some of the logical volumes, an embodiment provides a method of directing a read request to a logical volume where the requested data-chunk has not been deduplicated. For ease of understanding, the term volume will be used throughout to describe the storage location of the data-chunks. However, it should be understood by one skilled in the art that the methods and systems as described herein can be applied to any data storage division, for example, disks, disk arrays, volumes, partitions, and the like. The system implements a deduplication policy across the system to ensure that the data-chunk will be stored in plain format on at least one of the logical volumes. The deduplication policy identifies one of the volumes, from the primary volume and the mirrored volume corresponding to the primary volume, to not be deduplicated. Thus, when a read request is received, the system knows which volume to direct the read request to, because the system knows which volume was not deduplicated based on the implemented deduplication policy.

The deduplication policy may be enabled at an individual disk level. For example, one disk may be a mirror of another disk. Therefore, the mirrored disk will only include mirrors of the logical volumes contained on the primary disk and the primary disk will only include the primary version of the logical volumes. The deduplication policy may then be applied to each of the disks in order to maintain target deduplication policies. The deduplication policy may also be enabled at a disk array level. In such a scenario, the system may include multiple disks and each disk may include either primary or mirrored versions of logical volumes. The deduplication policy may then be applied across the disk arrays in order to increase the performance of the system.

In one embodiment, the deduplication policy may only be applied to hot data-chunks. Hot data-chunks may be considered those data-chunks which are frequently accessed. Frequently may be a relative term and may be determined by the system. For example, frequently accessed data-chunks may be considered those data-chunks which are accessed multiple times within a predetermined threshold. As another example, frequently accessed data-chunks may be considered those which are used by the system to perform particular functions. Applying the deduplication policy to only hot data-chunks may reduce the level of overhead that may be required for implementing the data deduplication policy. However, the deduplication policy may be applied to all data-chunks, including both hot and cold data-chunks, depending on the system and performance desired. Additionally, in a single system, the deduplication policy may be applied to only hot data-chunks for one volume pair and both hot and cold data-chunks for another volume pair.

Such a system provides a technical improvement over current systems for implementing deduplication techniques on systems with disk mirrors. For example, the systems and methods as described herein apply a deduplication policy to volumes where the policy provides that one of the volumes from a mirrored volume(s) and primary volume keeps data-chunks in plain format. Thus, when a read request is received, the system can identify the volume that has the data-chunk stored in plain format based upon the deduplication policy. Additionally, such a system provides improvements over current systems for processing read requests by directing the read requests to the logical volume where the requested data-chunk is stored in plain format.

Thus, rather than the read request possibly being directed to a data block containing only a link or reference to another data block and then being directed to the other data block, the read request can be directed directly to the data block containing the data-chunk in plain format. Therefore, the systems and methods as described herein reduce the amount of processing time and access time required to process a read request. For example, referring to FIG. 1B, a read request 101B that is received by an I/O scheduler 102B is directed to the logical volume 105B containing the data-chunk in plain format, rather than the logical volume 104B containing a reference or link to the volume that is not deduplicated 105B. Thus, the response time 103B is reduced since the read request 101B does not have to be redirected.

Figure 1A:
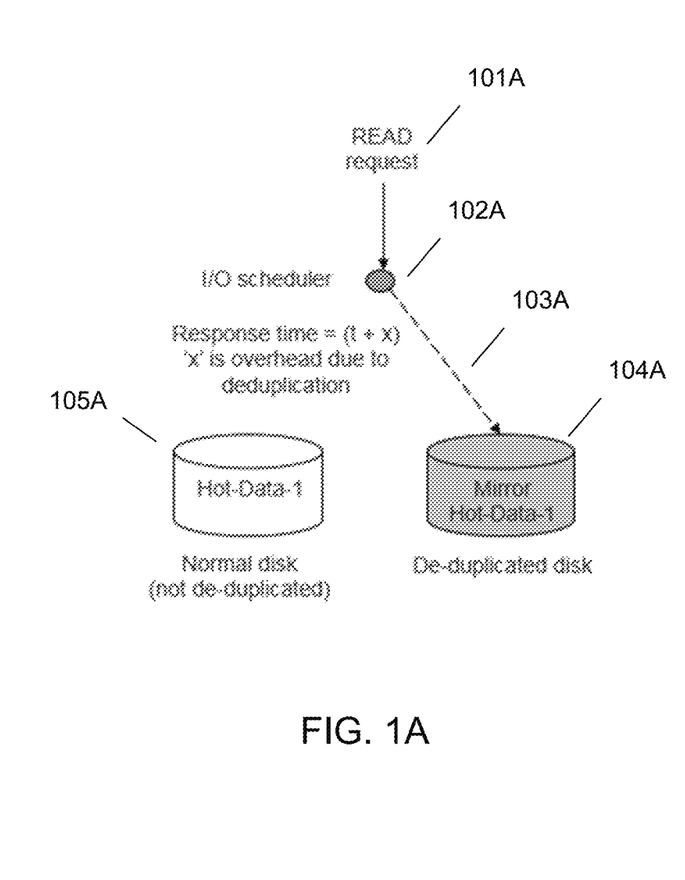
FIG. 1A-1B illustrates an example response time reduction with a deduplication policy.
Figure 1B:
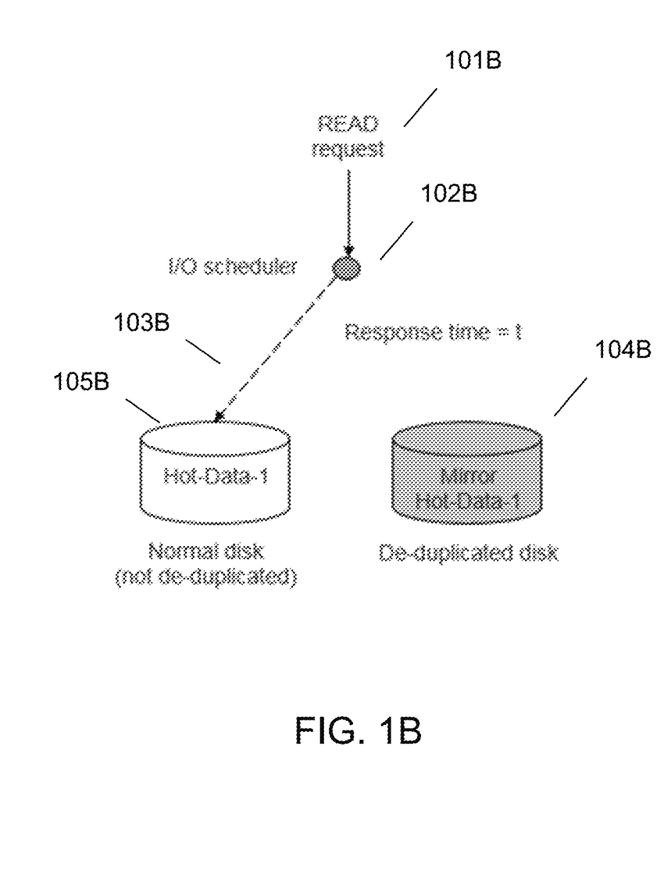
Figure 2:
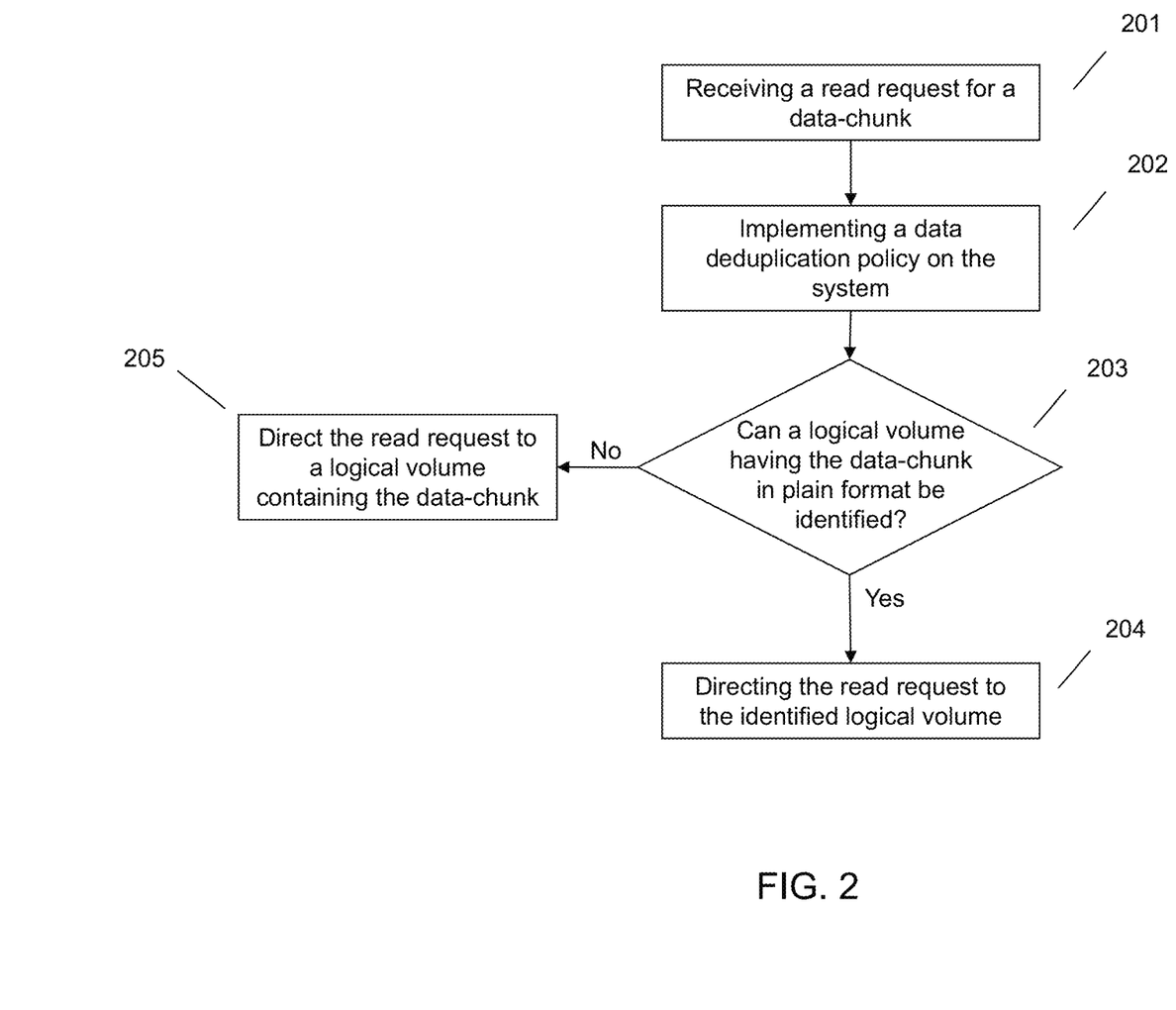
FIG. 2 illustrates a method of directing read request with disk deduplication.

Referring now to FIG. 2, an embodiment may receive a read request for a data-chunk at 201. The read request may include an access request for a data-chunk. This read request may be the result of a request to copy, read, or otherwise access the data-chunk. The data-chunk may be stored on a system which has a plurality of logical volumes where at least one of the logical volumes is a mirrored logical volume corresponding to another of the logical volumes, referred to herein as the primary logical volume. In one embodiment, the system may include a plurality of data disks which contain the logical volumes. In such an embodiment, the mirrored logical volume may be on a data disk separate from the primary logical volume. However, although not typically implemented in practice due to the desire for redundancy across multiple hardware components, mirrored logical volumes may also be contained on the same disk as a primary logical volume. In addition, in one embodiment, the system may contain multiple mirrors of a single volume. For example, a system may contain three mirrors of a single primary volume.

At 203, an embodiment may attempt to identify one of the logical volumes from the mirrored volume, or plurality of mirrored volumes, and the primary volume on which the requested data-chunk is stored in plain format. Plain format refers to the format in which the data-chunk was initially saved. In other words, plain format refers to the format which is not found within the mirrored or copied data-chunks (e.g., a reference or link to the data block having the data-chunk in plain format). In identifying the logical volume in which the requested data-chunk is stored in plain format, an embodiment may implement a data deduplication policy on the system at 202.

The data deduplication policy may ensure that the data-chunk is in plain format on at least one of mirrored or primary volumes. The data deduplication policy may designate one of the logical volumes from the mirrored volume(s) and the corresponding primary volume to not be deduplicated. In an embodiment where more than one mirrored volume exists for a primary volume, the data deduplication policy may designate any one of the mirrored volumes or the primary volume as not being deduplicated. The policy may be implemented in such a way that not all deduplicated volumes are contained on a single disk. This may allow the system to achieve target deduplication ratios on all disks, which assists in achieving desired storage utilization ratios.

Figure 3:
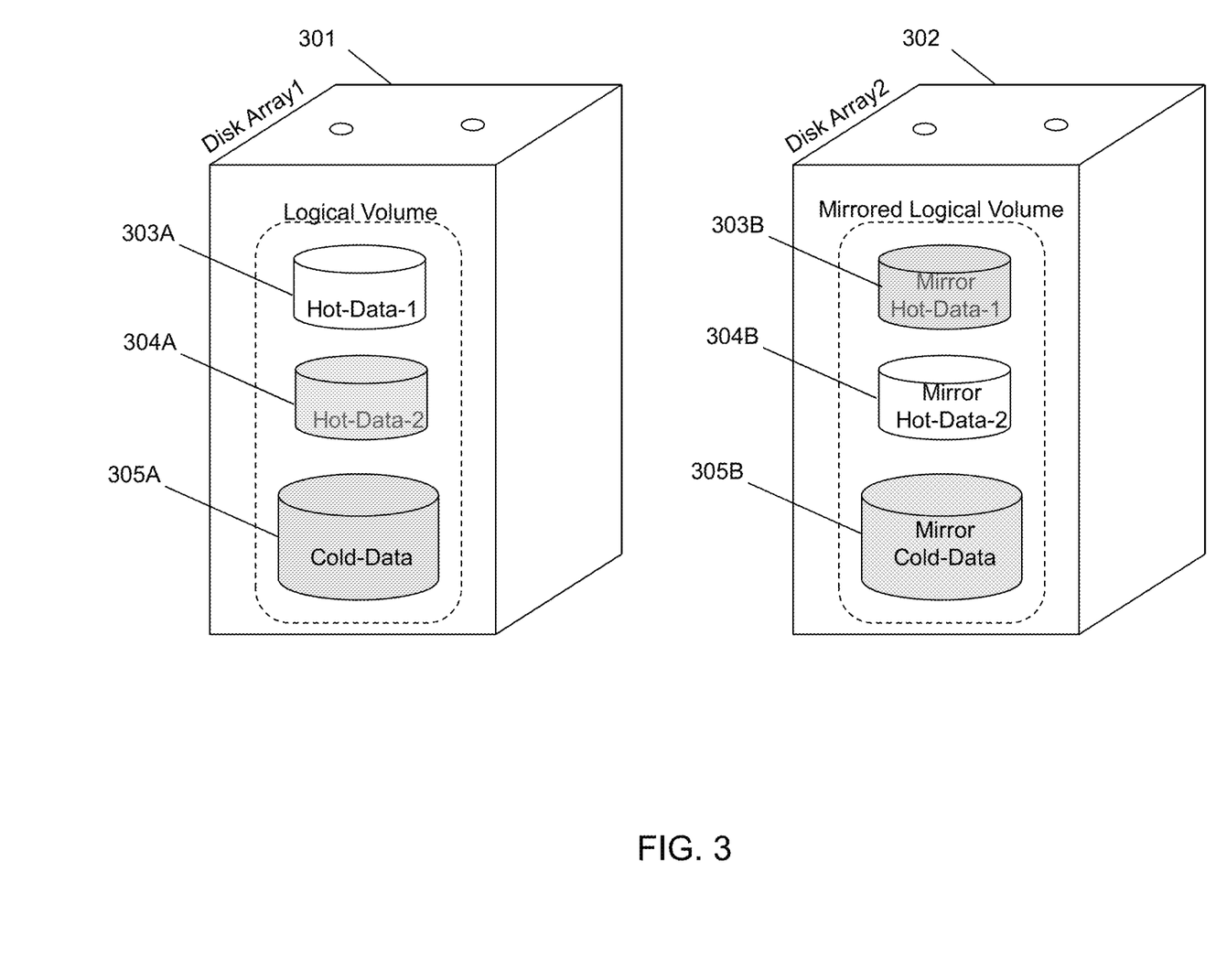
FIG. 3 illustrates an example deduplication policy set at an individual disk level.

The deduplication policy may be implemented or enabled at an individual disk level. For example, referring to FIG. 3, the system may comprise two disk arrays, Disk Array 1 301 and Disk Array 2 302. Each of the disk arrays contain three logical volumes, 303A, 304A, and 305A on Disk Array 1 301, and 303B, 304B, and 305B on Disk Array 2 302. As depicted in FIG. 3, Disk Array 2 302 contains the mirrored volumes from Disk Array 1 301. Such a configuration (e.g., one disk containing only mirrored volumes of another disk containing only primary volumes) is generally applied on individual disks within a system. Thus, the deduplication policy may be applied on the individual disk level. The deduplication policy may designate which volumes should be deduplicated or, conversely, which volumes should not be deduplicated.

The volumes shaded in gray (303B, 304A, 305A, and 305B) represent volumes that have been designated for deduplication for this example. Thus, the remaining volumes (303A and 304B) have been designated as not being deduplicated. As can be understood by one skilled in the art, the examples shown in FIG. 3 and FIG. 4 (which is described more fully below) are merely examples for explanation. The deduplication policy can be applied to any of the volumes as necessary for the system. In addition, as described in more detail below, the deduplication policy may also be applied to the cold data-chunks, even though in both FIGS. 3 and 4, all the volumes containing the cold data-chunks are shown as being deduplicated.

As shown in FIG. 3, for each of the volume pairs containing hot data-chunks (pair 303A and 303B and pair 304A and 304B) one of the volumes has been designated as not being deduplicated, volumes 303A and 304B. In order to maintain deduplication ratios, the volumes which are designated for deduplication or not to be deduplicated may alternate between the different disks. For example, in FIG. 3, the logical volume containing hot data-chunks 1 303A on Disk Array 1 301 has been designated as not being deduplicated. Conversely, the logical volume containing hot data-chunks 2 304B on Disk Array 2 301 has been designated as not being deduplicated. Such alternation helps to ensure that the performance of the disk does not degrade even though an entire volume has been designated for not being deduplicated. The deduplication policy does not have to alternate the designation between the two or more disks. Rather, other methods for the deduplication policy may be implemented. For example, the volumes chosen for designation may be based upon size, processing speed, location, and the like. In the case of a system having more than one mirrored volume of a primary volume, the designation of the volume to not be deduplicated may be applied to only one of the mirrored or primary volumes. Alternatively, depending on system requirements, the deduplication policy may designate more than one of the volumes as not being deduplicated.

Figure 4:
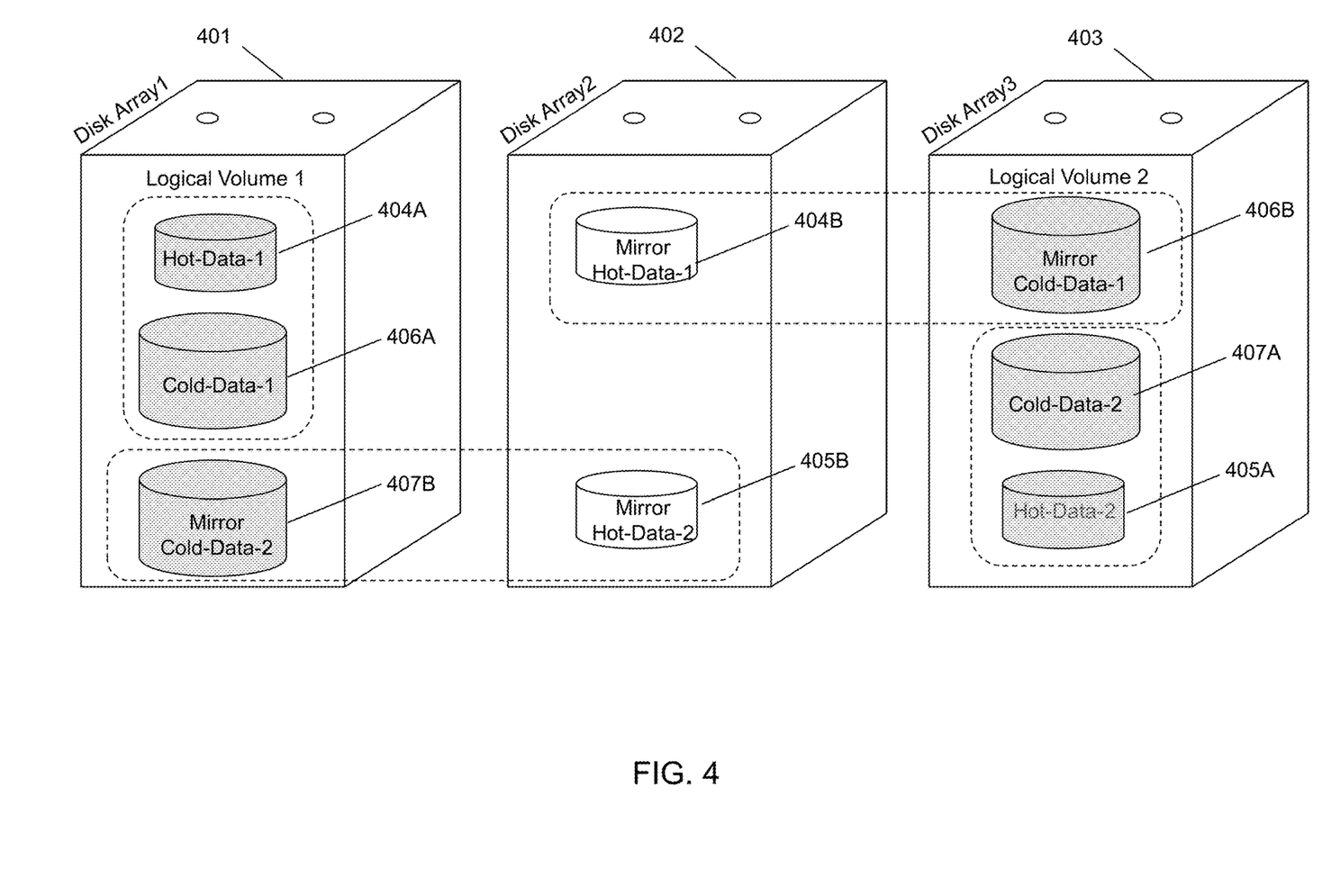
FIG. 4 illustrates an example deduplication policy set at a disk array level.

The data deduplication policy may also be implemented or enabled at a disk array level, for example, as shown in FIG. 4. The system contains three disk arrays, Disk Array 1 401, Disk Array 2 402, and Disk Array 3 403. As can be seen by FIG. 4, each disk array may contain either primary or mirrored volumes. For example, Disk Array 1 401 contains primary volumes for hot data-chunks 1 404A and cold data-chunks 1 406A, and a mirrored volume of cold data-chunks 2 407B. Such a configuration (e.g., each disk containing both primary and mirrored volumes) is generally applied for disk arrays. These disk array systems may be managed by a logical volume manager which is a storage space management tool which, at least in part, allocates disks and mirrors and resizes logical volumes contained on the disk. Thus, the deduplication policy may be applied to the disk array level and designate which volumes across the disk array should be deduplicated or not be deduplicated.

As with FIG. 3, the volumes shaded in gray (404A, 406A, 407B, 406B, 407A, and 405A) represent the volumes which have been designated as being deduplicated. Thus, the volumes not shaded in gray (404B and 405B) have been designated as not being deduplicated. One method to ensure that the system can keep track of which volume has the requested data-chunk stored in plain format is to designate one disk as only having data blocks in plain format, for example, as shown in FIG. 4 with Disk Array 402. However, this is not the only way to implement the deduplication policy. The logical volume manager may also assist in application of the data deduplication policy.

As briefly discussed above, the data deduplication policy may only be applied to hot data-chunks. Depending on the system, not deduplicating both the hot data-chunks and the cold data-chunks may be cumbersome due to the size of cold data-chunk volumes or result in a degradation of the performance of the system due to storage utilization ratios. Thus, in one embodiment, none of the volumes containing cold data-chunks may be designated for not being deduplicated. However, if possible, applying the deduplication policy to all types of volumes is beneficial. Additionally, the system may designate only a portion of the cold data-chunk volumes for not being deduplicated. Thus, in such an embodiment, some of the pairs (or groups in the case of having multiple mirrors for a single primary volume) of cold data-chunk volumes may be deduplicated, while some of the pairs of cold data-chunk volumes are designated for not being deduplicated.

Thus, in identifying whether a logical volume having the data-chunk in plain format can be identified at 203, an embodiment may identify which of the volumes the deduplication policy designated as not being deduplicated. If none of the logical volumes was designated as not being deduplicated, or if the volume cannot be identified, the read request may be directed to any of the logical volumes containing the requested data-chunk at 205. Thus, the read request may be directed to a volume in which the data-chunk only contains a reference or link to the data-chunk where the data are stored in plain format. For example, if none of the cold data-chunk volumes has been designated for not being deduplicated, a read request for a cold data-chunk may be directed to any of the volumes containing the requested data-chunk.

If, however, the logical volume containing the data-chunk in plain format can be identified, for example, because that volume was designated for not being deduplicated, the read request may be directed to that logical volume at 104. For example, if the read request is for a hot data-chunk in a system in which at least one of the hot data-chunks volumes in a pair of volumes has been designated for not being deduplicated, the read request may be directed to that volume designated as not being deduplicated.

Figure 5:
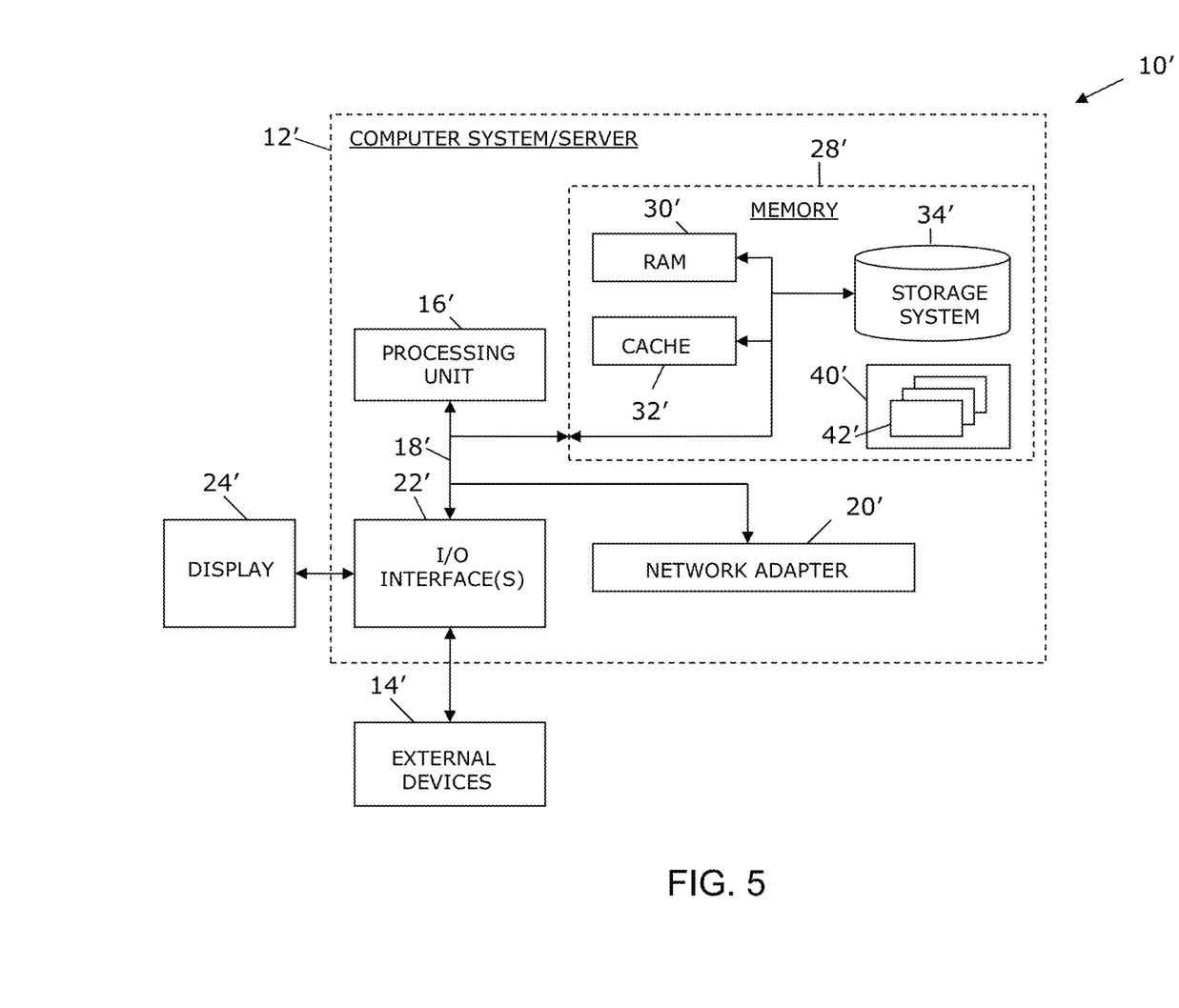
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving a read request for a data-chunk, wherein the data-chunk is stored on a system comprising a plurality of disks, each containing a plurality of logical volumes and wherein at least one of the logical volumes comprises a mirrored logical volume corresponding to another of the at least one logical volumes;
identifying one of the logical volumes of the system where the requested data-chunk is stored in plain format, wherein another of the logical volumes comprises a reference to the one of the logical volumes having the requested data-chunk in plain format, wherein the identifying comprises:
ensuring the data-chunk is in plain format on one of the logical volumes by implementing a data deduplication policy on the system, wherein the data deduplication policy automatically, based upon system requirements, designates one of the logical volumes from the mirrored logical volume and the corresponding logical volume as not being deduplicated, wherein the data-chunk may be stored in plain format on either the mirrored logical volume or the corresponding logical volume, and wherein the data deduplication policy maintains designated deduplication ratios for each of the plurality of disks, the designated deduplication ratios identifying a percentage of each of the plurality of disks to be deduplicated, wherein to maintain the deduplication ratio the deduplication policy identifies a subset of the plurality of logical volumes from one of the plurality of disks for deduplication and the remaining of the subset of the plurality of logical volumes as not being deduplicated; and
wherein the identified one of the logical volumes comprises the designated non-deduplicated logical volume that comprises the data-chunk in plain format; and
directing the read request to the identified one of the logical volumes comprising the data-chunk in plain format.

2. The method of claim 1, wherein the system comprises a plurality of storage disks each having a plurality of logical volumes.

3. The method of claim 2, wherein the mirrored logical volume is stored on a storage disk different from the corresponding another of the at least one logical volumes.

4. The method of claim 2, wherein the data deduplication policy is enabled at an individual disk level.

5. The method of claim 2, wherein the data deduplication policy is enabled at a disk array level.

6. The method of claim 1, wherein the data deduplication policy is applied to hot data-chunks within a logical volume and not applied to cold data-chunks within the logical volume.

7. The method of claim 6, wherein the read request comprises a read request for a hot data-chunk.

8. The method of claim 6, wherein a read request for a cold data-chunk is directed to any logical volume comprising the requested cold-data chunk.

9. The method of claim 1, wherein the data deduplication policy is applied to both hot data-chunks and cold data-chunks.

10. The method of claim 1, wherein the system comprises more than one mirrored logical volume corresponding to another of the at least one logical volumes.

11. The method of claim 10, wherein the data deduplication policy designates one of the logical volumes from the more than one mirrored logical volume and the corresponding logical volume as not being deduplicated.

12. An apparatus, comprising:
at least one processor; and
a non-transitory computer readable storage medium having computer readable program code embodied therewith and executable by the at least one processor, the computer readable program code comprising:
computer readable program code that receives a read request for a data-chunk, wherein the data-chunk is stored on a system comprising a plurality of disks, each containing a plurality of logical volumes and wherein at least one of the logical volumes comprises a mirrored logical volume corresponding to another of the at least one logical volumes;
computer readable program code that identifies one of the logical volumes of the system where the requested data-chunk is stored in plain format, wherein another of the logical volumes comprises a reference to the one of the logical volumes having the requested data-chunk in plain format, wherein the identifying comprises:
ensuring the data-chunk is in plain format on one of the logical volumes by implementing a data deduplication policy on the system, wherein the data deduplication policy automatically, based upon system requirements, designates one of the logical volumes from the mirrored logical volume and the corresponding logical volume as not being deduplicated, wherein the data-chunk may be stored in plain format on either the mirrored logical volume or the corresponding logical volume, and wherein the data deduplication policy maintains designated deduplication ratios for each of the plurality of disks, the designated deduplication ratios identifying a percentage of each of the plurality of disks to be deduplicated, wherein to maintain the deduplication ratio the deduplication policy identifies a subset of the plurality of logical volumes from one of the plurality of disks for deduplication and the remaining of the subset of the plurality of logical volumes as not being deduplicated; and wherein the identified one of the logical volumes comprises the designated non-deduplicated logical volume that comprises the data-chunk in plain format; and computer readable program code that directs the read request to the identified one of the logical volumes comprising the data-chunk in plain format.

13. A computer program product, comprising:

a non-transitory computer readable storage medium having computer readable program code embodied therewith, the computer readable program code comprising:

computer readable program code that receives a read request for a data-chunk, wherein the data-chunk is stored on a system comprising a plurality of disks, each containing a plurality of logical volumes and wherein at least one of the logical volumes comprises a mirrored logical volume corresponding to another of the at least one logical volumes;

computer readable program code that identifies one of the logical volumes of the system where the requested data-chunk is stored in plain format, wherein another of the logical volumes comprises a reference to the one of the logical volumes having the requested data-chunk in plain format, wherein the identifying comprises:

ensuring the data-chunk is in plain format on one of the logical volumes by implementing a data deduplication policy on the system, wherein the data deduplication policy automatically, based upon system requirements, designates one of the logical volumes from the mirrored logical volume and the corresponding logical volume as not being deduplicated, wherein the data-chunk may be stored in plain format on either the mirrored logical volume or the corresponding logical volume, and wherein the data deduplication policy maintains designated deduplication ratios for each of the plurality of disks, the designated deduplication ratios identifying a percentage of each of the plurality of disks to be deduplicated, wherein to maintain the deduplication ratio the deduplication policy identifies a subset of the plurality of logical volumes from one of the plurality of disks for deduplication and the remaining of the subset of the plurality of logical volumes as not being deduplicated; and wherein the identified one of the logical volumes comprises the designated non-deduplicated logical volume that comprises the data-chunk in plain format; and computer readable program code that directs the read request to the identified one of the logical volumes comprising the data-chunk in plain format.

14. The computer program product of claim 13, wherein the system comprises a plurality of storage disks each having a plurality of logical volumes.

15. The computer program product of claim 14, wherein the data deduplication policy is enabled at an individual disk level.

16. The computer program product of claim 13, wherein the data deduplication policy is applied to hot data-chunks within a logical volume and not applied to cold data-chunks within the logical volume and wherein the read request comprises a read request for a hot data-chunk.

17. The computer program product of claim 16, wherein a read request for a cold data-chunk is directed to any logical volume comprising the requested cold-data chunk.

18. The computer program product of claim 13, wherein the system comprises more than one mirrored logical volume corresponding to another of the at least one logical volumes.

19. The computer program product of claim 18, wherein the data deduplication policy designates one of the logical volumes from the more than one mirrored logical volume and the corresponding logical volume as not being deduplicated.

20. A method, comprising:

implementing a data deduplication policy on a system comprising a plurality of disks, each containing a plurality of logical volumes, wherein one of the logical volumes comprises a mirrored logical volume corresponding to another of the logical volumes;

the data deduplication policy automatically, based upon system requirements, designates one of the logical volumes from the mirrored logical volume and the corresponding logical volume as not being deduplicated, wherein the data-chunk may be stored in plain format on either the mirrored logical volume or the corresponding logical volume, and wherein the data deduplication policy maintains designated deduplication ratios for each of the plurality of disks, the designated deduplication ratios identifying a percentage of each of the plurality of disks to be deduplicated, wherein to maintain the deduplication ratio the deduplication policy identifies a subset of the plurality of logical volumes from one of the plurality of disks for deduplication and the remaining of the subset of the plurality of logical volumes as not being deduplicated;

receiving a read request for a data-chunk stored on at least one of the logical volumes, wherein the data-chunk is stored in plain format on one of: the mirrored logical volume and the corresponding logical volume, and wherein a reference to the logical volume having the requested data-chunk in plain format is stored on the other of the: mirrored logical volume and the corresponding logical volume; and directing the read request to the logical volume that has been designated as not being deduplicated and, thereby, comprising the data-chunk in plain format.

* * * * *